United States Patent [19]

O'Sullivan et al.

[11] 4,038,345

[45] July 26, 1977

[54] HIGH VISCOSITY CYANOACRYLATE ADHESIVE COMPOSITIONS, AND PROCESS FOR THEIR PREPARATION

[75] Inventors: Denis J. O'Sullivan; Bernard J. Bolger, both of Dublin, Ireland

[73] Assignee: Loctite (Ireland), Limited, Dublin, Ireland

[21] Appl. No.: 592,695

[22] Filed: July 2, 1975

Related U.S. Application Data

[63] Continuation-in-part of Ser. No. 403,375, Oct. 4, 1973, abandoned, which is a continuation-in-part of Ser. No. 212,717, Dec. 27, 1971, abandoned.

[51] Int. Cl.² .......................................... C08L 33/00
[52] U.S. Cl. .................................. 260/881; 260/885
[58] Field of Search ................. 260/881, 86.1, 403, 260/375, 885

[56] References Cited

U.S. PATENT DOCUMENTS

| 3,178,379 | 4/1965 | Wicker, Jr. et al. | 260/881 |
| 3,354,128 | 11/1967 | Wicker | 260/881 |

*Primary Examiner*—J. Ziegler
*Attorney, Agent, or Firm*—Jean B. Mauro; J. Rodney Reck

[57] ABSTRACT

Stable cyanoacrylate adhesive compositions having viscosities greater than about 200 centipoise are prepared by incorporating therein, as a thickening agent, a soluble acrylic polymer having a reduced viscosity of about 5 or greater, and a content of free radical polymerization initiator less than 1% by weight. These properties are obtained by subjecting the thickening agent to temperatures of about 140°–180° C. for about 30–180 minutes prior to incorporating it in the cyanoacrylate.

10 Claims, No Drawings

HIGH VISCOSITY CYANOACRYLATE ADHESIVE COMPOSITIONS, AND PROCESS FOR THEIR PREPARATION

CROSS-REFERENCE TO RELATED APPLICATION

This is a continuation-in-part of our copending application Ser. No. 403,375, filed Oct. 4, 1973, which, in turn, was a continuation-in-part of copending application Ser. No. 212,717, filed Dec. 27, 1971, both now abandoned.

BACKGROUND OF THE INVENTION

This invention deals with polymerizable cyanoacrylate adhesives, compositions containing as a major active ingredient at least one monomeric ester of 2-cyanoacrylic acid. These compositions are stabilized to prevent premature or spurious polymerization prior to the time of intended use.

Cyanoacrylate adhesive compositions are extremely sensitive, and great care must be exercised in their formulation. Cure (polymerization) is generally considered to be initiated by an anionic mechanism, with water being a sufficiently strong base to initiate cure under most circumstances. The adhesives remain shelf stable items of commerce as long as they are suitably packaged, but when placed on a substrate to be bonded and exposed to atmospheric and surface moisture in so doing, cure generally is instituted in a relatively short period of time, generally in less than 1 minute and on many surfaces in a matter of a few seconds.

Because of their exceptional speed of cure, cyanoacrylate adhesives offer many advantages. To render cyanoacrylate adhesive compositions useful in adhesive bonding, attempts have been made to increase the viscosity of the adhesive. Increased viscosity is desirable and in many cases essential in order to fill larger gaps and to retain the adhesive on the substrates to be bonded prior to cure. Acrylic polymers of various types have been disclosed as useful thickeners, such as poly (ethyl 2-cyanoacrylate) of U.S. Pat. No. 3,564,078 to Wicker et al, issued Feb. 16, 1971, and poly (methylmethacrylate) of U.S. Pat. No. 3,282,773 to Wicker et al, issued Nov. 1, 1966.

Heretofore, however, it has not been possible to prepare acceptable cyanoacrylate compositions of increased viscosity, such as above about 200 centipoise. The major problem has been the stability problems which have been produced above that viscosity level, since shelf stabilities of less than 6 months commonly have been encountered. In addition, when higher levels of thickening agents were incorporated, substantial reductions in adhesive bond strength, in ability to cure in larger gaps between substrates (such as 5 mils or greater), and in optical clarity in the cured adhesive product have been encountered.

The ability to prepare cyanoacrylate adhesive compositions with viscosities of greater than 200 centipoise which do not suffer from the aforementioned shortcomings of the prior art, would be a major advance in adhesive technology and would permit the production of novel and extremely useful adhesive compositions.

THE INVENTION

This invention concerns adhesive compositions having viscosities in excess of about 500 centipoise comprising at least one monomeric ester of 2-cyanoacrylic acid, and a polyacrylate thickener pretreated to have a reduced viscosity greater than about 5 and a content of free radical polymerization initiators less than about one percent by weight. The composition additionally contains an inhibitor for the anionic polymerization of the monomeric ester or esters, but the specific inhibitor chosen is not material for the broad purposes of this invention.

In another aspect, this invention concerns a process for preparing improved cyanoacrylates which involves heating a conventional polyacrylate thickener at a suitable temperature and for a suitable period of time to reduce its content of free radical polymerization initiators to below about one percent, and increase its reduced viscosity to greater than 5; and dissolving a sufficient amount of said thickener in the above described ester of 2-cyanoacrylic acid to produce a cyanoacrylate adhesive composition having a viscosity of at least about 500 centipoise.

DISCUSSION OF THE INVENTION AND ITS PREFERRED EMBODIMENTS

The benefits of this invention are achievable in essentially all adhesive compositions based upon one or mixtures of monomeric esters of 2-cyanoacrylic acid. Most commonly, these esters have the formula

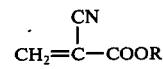

wherein R represents a $C_{1-16}$ alkyl, cycloalkyl, alkenyl, cycloalkenyl, phenyl or heterocyclic (e.g., furfuryl) radical. Naturally, the above R group can contain linkages and substituents which do not adversely affect the monomer in the performance of its intended function in the cyanoacrylate adhesive compositions, such as strongly basic substituents which would adversely affect the stability of the adhesive.

The above monomeric esters of 2-cyanoacrylic acid can be prepared by methods well known in the art, such as by the processes described in U.S. Pat. No. 2,467,927 to Ardis, issued Apr. 9, 1949, and U.S. Pat. No. 3,254,111 to Hawkins et al, issued May 31, 1966. The esters may be used singly or in combination to form the cyanoacrylate adhesives. The preferred esters are those wherein R is a cyclohexyl, furfuryl or a $C_{1-5}$ alkyl or alkenyl radical.

The thickeners used in the adhesive compositions of this invention are polyacrylate polymers. Generally these polymers having the repeating unit

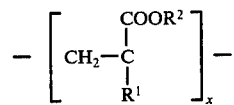

wherein $R^1$ is hydrogen, ethyl or methyl and $R^2$ is a $C_1$ to $C_4$ alkyl or alkenyl group. The value of $x$ will be sufficiently high to produce a polymer having a reduced viscosity of at least 5, as is more fully discussed below. Preferably, $R^1$ is hydrogen or methyl and $R^2$ is methyl or ethyl. The most highly preferred compound is poly (methylmethacrylate), as outstanding properties have been obtained by its use.

As noted above, a number of polyacrylate thickeners have been used previously in cyanoacrylate adhesives, but these have not been successful due to their failure to conform to the reduced viscosity and free radical initiator content limitations required herein.

Reduced viscosity is a well-known property of polymer solutions (the higher the reduced viscosity, the higher the molecular weight of the solute), and may be defined as the ratio of the specific viscosity to the concentration, or $$\frac{\frac{n}{n_0} - 1}{C} \text{ where}$$

$n$ is the absolute viscosity of the solution, $n_0$ is the absolute viscosity of the solvent, and C is the concentration of the solute in the solution (when not greater than about 0.5%), expressed as percent by weight. Reduced viscosity values are available from the manufacturers of most polymeric materials, and in any case are quite simple to prepare, using the above formula.

To be useful in the composition of this invention, the thickener must have a reduced viscosity of at least about 5, and preferably at least about 6.5. The upper limit is basically a question of choice but, as a practical matter, will generally not exceed about 10.

It is well known in general terms that the higher the molecular weight, the less soluble a resin tends to be. However, this invention embodies the surprising discovery that good solubility of polyacrylate thickener in monomeric cyanoacrylate was retained in spite of the higher molecular weight.

It is also essential for the content of free radical initiator in the thickener to be less than 1.0% by weight. Preferably, the content of free radical initiator is less than about 0.5% by weight of the thickener. Significantly higher content of free radical initiators has been inherent in essentially all commercially available polyacrylate thickeners of the type described above, apparently traceable to the fact that the thickeners are prepared by free radical polymerization. The free radical initiators generally used in making these thickeners are peroxy initiators, the content of which can be determined easily by well-known analytical methods. The most commonly used peroxy initiators are the diacyl peroxides such as benzoyl peroxide.

The thickeners of this invention are incorporated into the cyanoacrylate monomer by stirring to form a solution. If desired, modest heating can be used to hasten dissolution. Such heating is preferably limited to temperatures of about 65° C. or less for a period of 30 minutes or less. Surprisingly, ease of dissolution will normally be obtained under these mild conditions, notwithstanding the relatively high reduced viscosity of the thickener. Under these treatment consitions, no volatilization of the components of the composition will occur.

The simple dissolution technique just described has been found to be entirely satisfactory to produce the useful thickened compositions of this invention without resorting to more complication known techniques for producing homogeneous systems, such as the mutual solvent-vacuum stripping technique desclosed by Wicker et al. in U.S. Pat. No. 3,178,379. Such a technique, while being useful for its intended purpose of combining ingredients, is not a substitute for the present invention, however, since it does not approach the thermal treatment conditions required for the proper treatment of the thickener to produce the necessary reduced viscosity and free radical initiator levels.

Thickeners meeting the above-defined reduced viscosity and free radical initiator content requirements can be prepared by the manufacturers of such thickeners by modified processing, or a standard commercially available thickener can be successfully treated, as will be more thoroughly discussed below.

Cyanoacrylate adhesives of this invention can be prepared within a wide viscosity range, but little advantage is obtained above about 20,000 centipoise. A preferred viscosity range is from about 750 to about 10,000 centipoise, and most preferably from about 1,000 to about 5,000 centipoise. The amount of thickener required to achieve a particular viscosity will vary with the reduced viscosity, but can be determined easily with a minimum of routine testing. For the broad range of compositions disclosed herein, thickener content may vary from about 1% to about 15% by weight of the adhesive composition, and generally will vary from about 3% to about 10% by weight.

As mentioned previously, it may be necessary to prepare a suitable thickener for the compositions of this invention from conventional polyacrylate thickeners. These conventional thickeners generally have a reduced viscosity in the approximate range of 2 to 3.5, and a free radical initiator content of at least about 1%, although in some cases it may be somewhat lower, say, about 0.8% by weight. This conventional material (preferably dissolved in a suitable solvent such as methylene chloride) if maintained at an elevated temperature for a suitable period of time, will develop a decreased content of free radical initiator, and gain a suitably high reduced viscosity, satisfactory for use in the compositions of this invention. A satisfactory temperature ranrange is between about 140° and 180° centigrade, and a satisfactory time period is from about 30 to 180 minutes. Naturally, the above time/temperature combination may be varied to some extent as will be well recognized by the worker in the art, to produce a polyacrylate thickener having the required properties described above. The thickener so prepared may then be recovered and dissolved in the cyanoacrylate adhesive to prepare compositions of this invention.

In addition to the above-named ingredients, the cyanoacrylate adhesive compositions additionally contain an anionic inhibitor, e.g., an acidic substance, soluble in the ester of 2-cyanoacrylic acid, which inhibits anionic polymerization. As explained previously, the specific inhibitor chosen is not critical to this invention, and a number of suitable inhibitors of anionic polymerization are well known in the art.

The earliest of these are the soluble acidic gasses such as sulfur dioxide, sulfur trioxide, nitric oxide, and hydrogen fluroride. More recently, organic sultone inhibitors have been developed, the sultone being generally represented by the formula

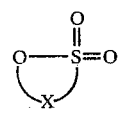

wherein X is an organic radical joining the —S(O$_2$)O— group in a 4, 5, or 6 member heterocyclic ring, preferably a 5 member heterocyclic ring. Preferably, X is a hydrocarbon group, although it can contain any substituents or linkages which do not adversely affect the sultone for its intended use as a stabilizer of the adhesive composition. Another excellent class of stabilizers is the organic sulfonic acids, preferably having a mulecular weight less than about 400. To be optimally useful as a stabilizer in the adhesive compositions, the sulfonic acid should have a pKA value (dissociation constant in water) of less than about 2.8, and preferably less than about 1.5.

While not essential, the cyanoacrylate adhesive compositions of this invention preferably also contain an inhibitor of free radical polymerization. The most desirable of these inhibitors are quinone and compounds of the phenolic type, such as hydroquinone, t-butyl catechol, p-methoxy phenol, etc.

The above inhibitors may be used within wide ranges, but the following general guidelines are representative of common practice, all figures being weight percent of the adhesive composition: acidic gasses—from about 0.001% to about 0.06% by weight; sultones—from about 0.1% to about 10% by weight; sulfonic acids —from about 0.0005% to about 0.1% by weight; free radical inhibitors—from about 0.001% to about 1%.

Another common additive for cyanoacrylate adhesive compositions is a plasticizer, which serves to make the cured bonds less brittle and, therefore, more durable. The most common of these plasticizers are $C_1$ to $C_{10}$ alkyl esters of dibasic acids such as sebasic acid and malonic acid. other plasticizers, such as diaryl ethers and polyurethanes, also may be used.

EXAMPLES

The following examples are given to demonstrate processes and compositions within the scope of the invention disclosed herein. The examples are not intended to be limitations upon the scope of the invention. Unless specifically stated to the contrary in the examples, all ratios and percentages therein are on a weight basis.

EXAMPLE 1

A cyanoacrylate adhesive composition was prepared by adding 6% by weight polymethylmethacrylate, 0.5% by weight propane sultone, and 0.01 % by weight hydroquinone to methyl-2-cyanoacrylate monomer. A uniform solution was produced by heating the mixture at 60° C for 20 minutes. The polymethylmethacrylate thickener which was used had a reduced viscosity of approximately 8.0 and a free radical initiator content, calculated as benzoyl peroxide, of approximately 0.3% by weight. The adhesive composition had excellent optical clarity and a viscosity of approximately 3000 centipoise at 25° C.

The compositions were stored at room temperature and found to have a shelf stability of a minimum of 6 months. The bonding properties of the cyanocrylate adhesive was tested by bonding the freshly cut ends of two pieces of ¼ inch diameter "Buna-N" rubber o-ring stock. After a cure time of 15 seconds, a force of 130 kilograms per square centimeter was required to break the bond.

EXAMPLE 2

A second cyanoacrylate adhesive composition was prepared using the above-described polymethylmethacrylate thickener. The composition was exactly as described in Example 1, except that the polymethylmethacrylate was used at a level of approximately 8% by weight of the adhesive composition. A uniform solution was obtained by heating the mixture at 60° C. for 25 minutes. The resulting composition had excellent optical clarity and a viscosity of approximately 12,000 centipoise at 25° C.

The composition was aged at room temperature and found to have a shelf stability of a minimum of 6 months. The bonding properties of the adhesive were determined by bonding the cut ends of 174 inch diameter "Buna-N" rubber o-ring stock. After a cure time of 15 seconds, a tensile force of 130 kilograms per square centimeter was required to break the adhesive bond.

EXAMPLE 3

A cyanoacrylate adhesive composition was prepared using ethyl-2-cyanoacrylate monomer containing approximately 0.5% by weight propane sultone, 0.01% by weight hydroquinone, and 5% by weight of the polymethylmethacrylate thickener described above in Example 1. A uniform solution of the ingredients was obtained by heating the mixture at 60° C. for about 25 minutes. The adhesive product had excellent optical clarity, and room temperature aging tests showed the product to have minimum shelf stability of 6 months. When the cut ends of "Buna-N" rubber o-ring stock were bonded with the adhesive of this example, strong, durable bonds were formed within 15 seconds, substantially as described in Example 2.

When, in the above example, the polymethylmethacrylate thickener is replaced in whole or in part by a polyethylmethacrylate thickener having substantially the same reduced viscosity and free radical initiator content, substantially similar results are obtained in that stable, viscous cyanoacrylate adhesive compositions are prepared which have rapid bonding characteristics comparable to conventional cyanoacrylate adhesive compositions.

EXAMPLE 4

A commercially available polymethylmethacrylate resin having a reduced viscosity of less than 5.0 and a free radical initiator content of more than 12 by weight, is dissolved in methylene chloride at such concentration that the solution remains very fluid. The solution is heated at a temperature of about 140°–180° C. for a period of about 30–180 minutes. The resin is recovered by removal of the solvent and drying, using standard techniques. The resin so treated is found to have a reduced viscosity of more than 5.0 and a free radical initiator content of less than 0.5% by weight. This resin is employed as a thickener in a cyanoacrylate composition as described in Example 1, and the adhesive composition so produced has similar viscosity and cured properties.

What is claimed is:

1. The process for preparing an improved cyanoacrylate adhesive composition which comprises heating an acrylate polymer which has a reduced viscosity of substantially less than 5 and a content of free radical polymerization initiator of at least about 1% by weight, at a temperature of about 140° to about 180° centigrade and for about 30 to about 180 minutes and thereby increasing the reduced viscosity to at least about 5 and reducing the content of free radical polymerization initiator to less than about 0.5% by weight, said acrylate polymer having the repeating unit

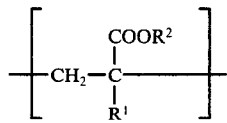

wherein $R^1$ is hydrogen, ethyl or methyl and $R^2$ is a $C_1$ to $C_4$ alkyl or alkenyl group; and dissolving a quantity of the polymer so treated into a mixture of a monomeric ester of 2-cyanoacrylic acid and about 0.0005% to about 10% by weight of an inhibitor of anionic polymerization, the quantity of polymer being sufficient to produce a cyanocrylate adhesive composition with a viscosity between about 500 and about 20,000 centipoise.

2. The process of claim 1 wherein $R^1$ is hydrogen or methyl, $R^2$ is methyl or ethyl, and the ester of 2-cyanoacrylic acid has the formula

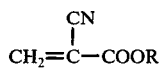

wherein R represents a $C_1$ to $C_{16}$ alkyl or alkenyl, cyclohexyl, phenyl or furfuryl radical, and the mixture additionally contains an inhibitor of free radical polymerization.

3. The process of claim 1 wherein the cyanoacrylate adhesive composition additionally contains an inhibitor of free radical polymerization.

4. The process of claim 1 wherein the acrylate polymer has a reduced viscosity between about 6.5 and about 10, and a content of free radical initiator of less than about 0.5% by weight.

5. The process of claim 3 wherein the cyanoacrylate adhesive composition has a viscosity between about 750 and about 10,000 centipoise.

6. The process for preparing a cyanoacrylate adhesive composition which comprises at least one monomeric ester of 2-cyanoacrylic acid, about 0.0005 to about 10% by weight of an inhibitor of anionic polymerization and about 1 to about 15% by weight of a polyacrylate thickener having the repeating unit

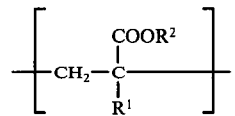

wherein $R^1$ is hydrogen, ethyl or methyl and $R^2$ is a $C_1$ to $C_4$ alkyl or alkenyl group, the improvement comprising heating the polyacrylate thickener at a temperature of about 140° to about 180° centigrade and for about 30 to about 180 minutes and thereby increasing its reduced viscosity to greater than about 5 and reducing its content of free radical polymerization initiator to less than about 1% by weight, and thereafter adding said polyacrylate thickener to the adhesive composition thereby increasing the viscosity of said composition to at least about 500 centipoise.

7. The process of claim 6 wherein the cyanoacrylate adhesive composition additionally contains an inhibitor of free radical polymerization.

8. The process of claim 6 wherein the polyacrylate thickener has a reduced viscosity between about 6.5 and about 10 and a content of free radical polymerization initiator of less than about 0.5% by weight.

9. The process of claim 8 wherein the cyanoacrylate adhesive composition has a viscosity between about 750 and 10,000 centipoise.

10. The process of claim 7 wherein $R^1$ is hydrogen or methyl, $R^2$ is methyl or ethyl, and the ester of 2-cyanoacrylic acid has the formula

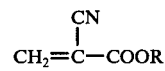

wherein R represents a $C_1$ to $C_{16}$ alkyl or alkenyl, cyclohexyl, phenyl or furfuryl radical.

* * * * *

UNITED STATES PATENT AND TRADEMARK OFFICE
CERTIFICATE OF CORRECTION

PATENT NO. : 4,038,345

DATED : July 26, 1977

INVENTOR(S) : Denis J. O'Sullivan et al.

It is certified that error appears in the above—identified patent and that said Letters Patent is hereby corrected as shown below:

Column 3, line 55, "consitions" should read

-- conditions --.

Column 4, line 36, delete "ran-".

Signed and Sealed this

Eighth Day of June 1982

[SEAL]

Attest:

Attesting Officer

GERALD J. MOSSINGHOFF

Commissioner of Patents and Trademarks